United States Patent Office 3,225,033
Patented Dec. 21, 1965

3,225,033
PENICILLIN DERIVATIVES AND PROCESS
David A. Johnson and Glenn A. Hardcastle, Jr., Syracuse, N.Y., assignors to Bristol-Myers Company, New York, N.Y., a corporation of Delaware
No Drawing. Filed Apr. 24, 1961, Ser. No. 104,802
9 Claims. (Cl. 260—239.1)

This invention relates to a new chemical compound, 8-hydroxypenillic acid, its salts and degradation products, and to new synthetic penicillins formed therefrom, and to various processes for their preparation. This invention also relates to improvements in processes for the production of 6-aminopenicillanic acid and to a chemical process for the purification of penicillins and, more particularly, the removal of penicillins from mixtures of 6-aminopenicillanic acid and penicillins.

It is an object of this invention to provide 8-hydroxypenillic acid and various acidic degradation products of 8-hydroxypenillic acid, the carboxylic acid salts thereof and methods for their preparation. It is also an object of this invention to provide chemical process improvements in known methods for the production of 6-aminopenicillanic acid. It is a further object of this invention to provide new synthetic penicillins having ultility as antibacterial agents.

It sometimes occurs in the preparation of penicillins that the final penicillin product is contaminated by the presence of 6-aminopenicillanic acid. The separation of the 6-aminopenicillanic acid and penicillin presents problems in that the desired product and the contaminant have similar solubility characteristics and hence are not completely separated in conventional extraction techniques. It is therefore an additional object of the present invention to provide a proces for the removal of 6-aminopenicillanic caid from penicillins which involves a minimum of manipulative operations and which is capable of efficient and economical operation.

It has been discovered that 6-aminopenicillanic acid reacts with carbon dioxide to form a new compound which has the following structural formula:

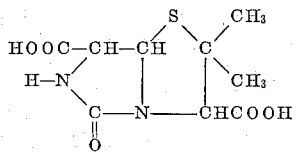

This new compound is 3,3-dimethyl-8-oxo-4-thia-1,7-diazobicyclo [3.3.0] octane-2,6-dicarboxylic acid, a compound having the empirical formula $C_9H_{12}N_2O_5S$ and a molecular weight of 260.26. Though this compound exists primarily as the structure shown above (a keto tautomer), it also may exist as the enolic tautomer, i.e., as a compound having the formula

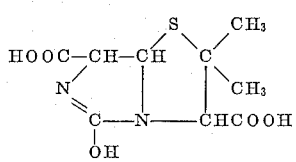

This compound has the complete nucleus of the penillic acids and can therefore be named 8-hydroxypenillic acid; the latter name is generally used herein in order to simplify nomenclature.

The disodium salt of 8-hydroxypenillic acid is readily obtained in pure crystalline form and is therefore a convenient means of identifying the compound. Neither 8-hydroxypenillic acid nor its disodium salt has significant antibacterial activity. 8-Hydroxypenillic acid has markedly different solubility characteristics as compared to 6-aminopenicillanic acid, e.g., it is soluble in methyl isobutyl ketone at pH 2, and thus is removable from 6-aminopenicillanic acid by extraction techniques. The chemical and physical properties of these compounds are set forth below in the several examples.

The reaction of 6-aminopenicillanic acid and carbon dioxide forming 8-hydroxypenillic acid is promoted by increasing the content of carbon dioxide in the reaction mixture. Such an increase of carbon dioxide content can be achieved most simply by increasing the pressure of carbon dioxide in contact with the reaction mixture, i.e., by bringing carbon dioxide and 6-aminopenicillanic acid into contact under greater than atmosphere pressure in a closed reaction vessel, or by increasing the rate of flow of carbon dioxide through the reaction mixture in an open reaction vessel. The effect of carbon dioxide pressure in controlling the rate of reaction is illustrated by the following Table I which shows the destruction of 6-aminopenicillanic acid in aqueous sodium bicarbonate buffer (2 mole $NaHCO_3$/mole 6-aminopenicillanic acid) solution at varying periods of time under varying pressures:

TABLE I

| 6-APA, Concentration at Start, mcg./ml. | P.s.i. $CO_2$ | Shaking Time, Hrs. | Percent 6-APA Remaining |
|---|---|---|---|
| 50,000 | 50 | 16 | 0.2 |
| 10,000 | 50 | 2 | 2.5 |
| 10,000 | 50 | 3 | 0 |
| 10,000 | 50 | 0.5 | 37.7 |
| 10,000 | 50 | 1 | 22.6 |
| 10.000 | 50 | 2 | 1.9 |
| 10,000 | 7 | 3 | 13.9 |
| 2,000 | 7 | 1 | 20 |
| 2,000 | 7 | 3 | 8 |
| 10,000 | 8 | 1 | 45 |
| 10,000 | 8 | 2 | 30 |

Combination of 6-aminopenicillanic acid with carbon dioxide seems to be the rate controlled step in the decomposition since removal of the carbon dioxide pressure (decreasing the carbon dioxide content of the reaction mixture) stops the reaction as shown below:

| P.s.i. Carbon Dioxide | Time, Hours | Percent 6-APA Remaining |
|---|---|---|
| 50 | 0.25 | 51.2 |
| Then: 0 | 1.25 | 45.8 |
|  | 3.25 | 48.0 |

The rate of reaction can be easily followed by determining the remaining 6-aminopenicillanic acid in the reaction mixture using the hydroxylamine assay for β-lactam; 8-hydroxypenillic acid does not interefere with this assay. The reaction of 6-aminopenicillanic acid and carbon dioxide takes place at a pH of from about 4 to 8; the preferred pH is from about 5 to 7. The reaction temperature can vary widely from about 0° C. (when the reaction rate is very low) to about 50° C., or higher, i.e., to the temperature at which 6-aminopenicillanic acid is decomposed; the preferred reaction temperature is from about 20 to 25° C.

As illustrated in the examples below, 8-hydroxypenillic acid can be hydrolyzed under acidic conditions to produce a compound having the structural formula

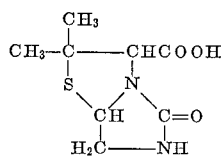

As illustrated in the examples below, 8-hydroxypenillic acid can be reacted under mild alkaline conditions to produce hydroxyisopenillic acid, a compound having the structural formula

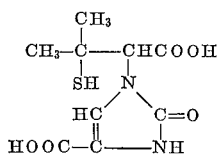

The chemical and physical properties of each of the above compounds are set forth in the examples below.

The new carboxylic acid compounds of the present invention are useful as intermediates in the preparation of synthetic penicillins.

Such new synthetic penicillins include those having the formula

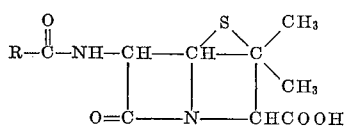

wherein R is selected from the group consisting of the following radicals:

(a) 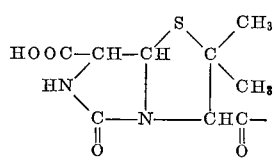

(b) 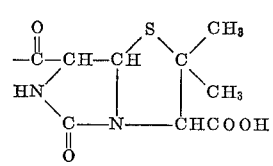

(c) 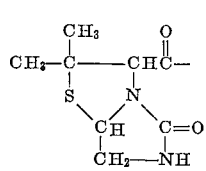

(d) 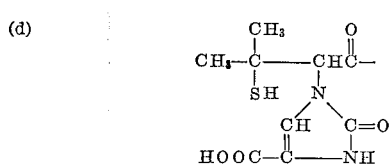

(e) 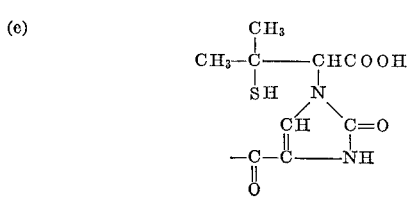

and their sodium, potassium, calcium, aluminum and ammonium salts and their nontoxic substituted ammonium salts with an amine selected from the group consisting of trialkylamines, procaine, dibenzylamine, N-benzyl-beta-phenethylamine, 1-ephenamine, N,N'-dibenzylethylenediamine, dehydroabietylamine, N,N' - bis - dehydroabietylethylenediamine and N-(lower)alkylpiperidine.

In addition to the penicillins described above wherein each R group is monovalent, the dicarboxylic acid compounds of this invention, hydroxypenillic acid and hydroxyisopenillic acid, can be used to form penicillins wherein two molecules of 6-aminopenicillanic acid are linked to one bivalent radical formed from such dicarboxylic acids. Such penicillins include those having the following structure

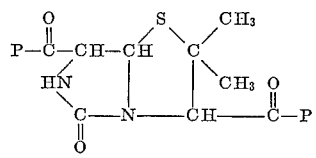

and

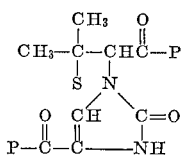

wherein "P" is

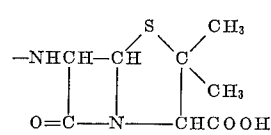

and their sodium, potassium, calcium, ammonium and substituted ammonium salts as set forth above. Such penicillins possess antibacterial activity and are prepared by forming a carboxylic acid chloride or mixed anhydride (e.g., with ethoxy- or isobutoxy-carbonic acid) of each of the compounds of this invention and reacting such acid chloride or mixed anhydride with 6-aminopenicillanic acid according to methods set forth in U.S. Patent No. 2,941,995 or No. 2,951,839 or South African Patent No. 59/3827, dated Sept. 29, 1959, and in the technical literature cited therein.

The compounds of this invention are also useful as sources of penicillamine since penicillamine can be prepared from each of them by known chemical degradation techniques. The compounds of this invention contain the thiazolidine and/or oxazolidine ring structure and are, therefore, useful in the preparation by known techniques for purposes of investigation of a series of compounds possessing such ring structures; such compounds are of a class having members known to possess antihistaminic and central nervous system activity.

It has also been discovered that carbon dioxide does not react with penicillins, i.e., an acylated 6-aminopenicillanic acid molecule, such as benzylpenicillin (penicillin G), α-aminobenzylpenicillin, α-phenoxyethylpenicillin, phenoxymethylpenicillin (penicillin V), 2,6-dimethoxyphenylpenicillin, etc., and it is concluded therefrom that the 6-amino group of 6-aminopenicillanic acid is essential to the reaction. It is therefore possible by simply contacting a mixture of a basic penicillin, e.g., α-aminobenzylpenicillin, and 6-aminopenicillanic acid and carbon dioxide, preferably under greater than atmospheric pressure and at a pH of about 6 to 7, to convert the 6-aminopenicillanic acid to 8-hydroxypenillic acid which can be extracted from the aqueous penicillin-containing reaction mixture, e.g., with methyl isobutyl ketone at pH 2, thus leaving an aqueous solution of basic penicillin free of 6-aminopenicillanic acid.

In another application of the foregoing discoveries it has been found that yields of 6-aminopenicillanic acid produced by the precursor-free fermentation of *Penicillium chrysogenum* (as described in U.S. Patent No. 2,941,995) can be increased by eliminating or minimizing the carbon dioxide content of the fermentation broth during and after the growth period and of the various solvents and solutions employed during the recovery of the 6-aminopenicillanic acid from the broth. Carbon dioxide is formed during fermentation by the metabolic processes of the organism and during recovery processes by the acidification of solutions containing sodium bicarbonate. Removal of the carbon dioxide in such solutions can be accomplished by receiving the carbon dioxide-containing solution of 6-aminopenicillanic acid into a vessel under reduced pressure and thereby stripping the carbon dioxide from the solution. Agitation or increasing the surface area (under reduced pressure) of the carbon dioxide-containing solution will increase the rate of removal of the carbon dioxide in accordance with well-known principles.

The following examples will serve to illustrate this invention without limiting it thereto.

*Example 1.—Preparation of the disodium salt of 8-hydroxypenillic acid*

Part A: A solution containing 2.16 gm. 6-aminopenicillanic acid and 1.682 gm. sodium bicarbonate in 216 ml. water is prepared and placed in a 500 ml. pressure vessel. The vessel is flushed out with carbon dioxide, sealed and carbon dioxide added to a pressure of 50 p.s.i.g. The reaction mixture is maintained under 50 p.s.i.g. carbon dioxide at room temperature with continuous shaking for a reaction period of 16 hours. After 16 hours the reaction mixture is removed from the pressure vessel and a sample taken from which it is determined by chemical assay that the β-lactam structure of 6-aminopenicillanic acid has been totally destroyed. The solution is concentrated to 10 ml. by evaporation and 25 ml. methanol and 50 ml. n-propanol is added whereupon a solid precipitates. An additional 50 ml. n-propanol is added to the suspension which is then stirred for two hours. The crystalline product, the disodium salt of 8-hydroxypenillic acid, is collected by filtration, washed with n-propanol and acetone, dried in vacuo at 50° C. and found to weigh 2.6 gm. Upon elemental analysis the product is found to have the following composition: C, 35.56%; H, 3.76%; N, 9.02%; S, 10.0%; Na, 16%. Calculated for $C_9H_{10}SNa_2$: C, 35.53%; H, 3.31%; N, 9.21%; S, 10.54%; Na 15.11%. The air-dried product is found to have an 11.4% moisture loss in vacuum, no significant ultraviolet absorption bands, and specific rotation of $[\alpha]_D^{24°}+232.6$ (C=1, water). After recrystallization from n-propanol-water-methanol, the product has a melting point of 250–251° C.

Part B: A solution of 6-aminopenicillanic acid (21.6 gm.; 0.1 mole) sodium bicarbonate (16.8 gm.; 0.2 mole) in 100 ml. of water is prepared and shaken in a 500 ml. pressure vessel under 50 p.s.i.g. of carbon dioxide for 16 hours at room temperature. After 16 hours the reaction mixture is removed from the pressure vessel and a sample taken from which it is determined by hydroxylamine assay that the β-lactam structure of 6-aminopenicillanic acid has been totally destroyed. The reaction mixture is diluted with 250 ml. of methanol and brought to the turbidity point by the addition of 500 ml. n-propanol. Some crystallization occurs during the addition of the n-propanol. After agitation of the mixture for one hour an additional 500 ml. of n-propanol is added over a one-hour period. After an additional hour of agitation after the addition of n-propanol, the crystalline precipitate is removed by filtration, washed successively with n-propanol and acetone and dried overnight in vacuo at 50° C. The crystallized product, the disodium salt of 8-hydroxypenillic acid (monohydrate), is found to weigh 29 gms. and to have a melting point of 249–250° C. The product is recrystallized twice from water-methanol-n-propanol and after drying is found to be the monohydrate and to have the following characteristics:

Moisture: 4.4% (Karl Fisher Method)
Other Volatiles: 6.7%
Specific rotation: $[\alpha]_D^{25}+259°$ (C=1, water)
Melting point: 250–251° C.
Elemental Analysis: C, 33.41%; H, 3.78%; N, 8.64%. Calculated for $C_9H_{10}N_2O_5SNa_2$: C, 35.53%; H, 3.31%; N, 9.21%; S, 10.54%.
Elemental Analysis: Calculated for $C_9H_{10}N_2O_5SNa_2 \cdot H_2O$: C, 33.54%; H, 3.75%; N, 8.69%; $H_2O$, 5.6%.
Infrared absorption spectrum with characteristic absorption maxima at the following wave lengths expressed in microns: 2.8—>3.0, 3.33, 5.88, 6.25, 7.10.

Part C: In the preparation of the free acid, the disodium salt prepared as described above is placed in water and the aqueous solution is acidified. The 8-hydroxypenillic acid is removed from the aqueous acidic solution by extraction into methyl isobutyl ketone and is precipitated from the solvent solution by addition to the concentrated solvent solution of the petroleum ether solvent (Skellysolve B) specified in Example 5 below. The product, 8-hydroxypenillic acid, is then collected by filtration, dried and found to have the following characteristics:

Melting point: 136–138° C.
Specific rotation: $[\alpha]_D^{25}+268°$ (C=1, water)
Infrared absorption spectrum in a KBr pellet with characteristic absorption maxima at the following wave lengths expressed in microns: 3.0, 3.35, 3.95, 5.80, 5.88, 5.96, 7.06, and 8.08.

*Example 2*

A solution containing 2.16 gm. 6-aminopenicillanic acid and 1.682 gm. sodium bicarbonate in 216 ml. water is prepared and placed in a 500 ml. pressure vessel. The vessel is flushed out with carbon dioxide, sealed and carbon dioxide added to a pressure of 50 p.s.i.g. The reaction mixture is maintained under 50 p.s.i.g. carbon dioxide at room temperature with continuous shaking for a reaction period of two hours. After reaction periods of 30 minutes, 60 minutes, 90 minutes and 120 minutes, samples of the reaction mixture are withdrawn and analyzed chemically for 6-aminopenicillanic acid. Concentration of 6-aminopenicillanic acid at the beginning of the reaction is 10,000 mcg./ml. Concentrations of 6-aminopenicillanic acid after various periods of reaction are as follows: 30 minutes, 3770 mcg./ml.; 60 minutes, 2260 mcg./ml.; 90 minutes, 230 mcg./ml. and 120 minutes, 190 mcg./ml. The reaction mixture is processed as in Example 1 above and the sodium salt of 8-hydroxypenillic acid is recovered. It is thereby determined that within a period of 120 minutes the reaction of carbon dioxide and 6-aminopenicillanic acid was substantially completed with the resultant formation of 8-hydroxypenillic acid.

*Example 3*

A 4 liter portion of filtered precursor-free *Penicillium chrysogenum* fermentation broth is adjusted to pH 2 with sulfuric acid and extracted with 2 liters methyl isobutyl ketone. The methyl isobutyl ketone extract (1450 ml.) [some methyl isobutyl ketone having been lost by emulsification] is extracted with 290 ml. of water previously adjusted to pH 7.5 with sodium bicarbonate. The aqueous extract is adjusted to pH 2 with sulfuric acid and extracted with 300 ml. n-butanol. The butanolic extract is then adjusted to pH 7 with a solution of sodium ethylhexanoate in methyl isobutyl ketone whereupon an oily precipitate is formed. The solution is then concentrated by evaporation until free of water and the solid precipitate is removed by filtration. The solid precipitate is dissolved in 20 ml. water, all butanol removed from the solution by evaporation and 10 ml. methanol and 30 ml. n-propanol is added whereupon a solid precipitates. The crystalline solid, the disodium salt of 8-hydroxypenillic acid, is collected by filtration, dried at room temperature and found to weigh 1.3 gms. The product is found to be identical to that of Examples 1 and 2 above.

*Example 4.—Preparation of the dimethyl ester of 8-hydroxypenillic acid*

Dry hydrochloric acid gas is bubbled into a solution of 8-hydroxypenillic acid (50.0 gm.; 0.165 mole) in 800 ml. of methanol until saturation becomes evident by evolution of the gas. The solution is then cooled for 17 hours, filtered and the salt cake collected in the filter washed with methanol. The filtrate is concentrated under reduced pressure to a volume of 300 ml. After concentration, the long colorless needle crystals formed during the concentration step are collected by filtration, washed with water and dried in vacuo over $P_2O_5$. The dried crystalline product which is found to weigh 31.5 gms., is recrystallized from hot n-propanol. The substantially anhydrous colorless crystalline product, the dimethyl ester of 8-hydroxypenillic acid, has the following characteristics:

Melting point: 171–172° C.
Elemental Analysis:
　Found: C, 46.01%; H, 5.6%; N, 9.85%.
　Calculated for $C_{11}H_{16}N_2O_5S$: C, 45.83%; H, 5.56%; N, 9.72%; S, 11.11%.
Infrared absorption spectrum with characteristic absorption maxima at the following wave lengths expressed in microns:
　3.02, 3.35, 5.7, 5.82, 5.96.
Ultraviolet absorption spectrum: no characteristic ultraviolet absorption maxima; has only end absorption.

The structural formula of the product, the dimethyl ester of 8-hydroxypenillic acid, is as follows:

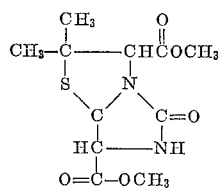

The characteristics set forth above are found to be in substantial agreement with the characteristics set forth in the literature for this compound (Clarke et al., "The Chemistry of Pencillins," pages 859 and 891).

*Example 5.—Acid hydrolysis of 8-hydroxypenillic acid*

A solution of 6.08 gm. of the disodium salt of 8-hydroxypenillic acid in 80 ml. of 12 N hydrochloric acid and 20 ml. of a formic acid-water mixture (80% formic acid) is heated to boiling temperature for a reaction period of ½ hour. The carbon dioxide evolved throughout the reaction period is collected in 500 ml. of a 10% aqueous solution of barium hydroxide. The pH of the barium hydroxide solution is maintained within the range alkaline by intermittent addition of sodium hydroxide. After completion of the reaction the barium hydroxide solution is filtered and 4.5 gm. of barium carbonate recovered.

The acidic reaction mixture is evaporated to dryness and the residue placed in hot acetone. The insoluble material, about 2 gm. of sodium chloride, is filtered off and discarded. The acetone filtrate is concentrated by evaporation to 10 ml., acidified with one drop of concentrated hydrochloric acid, and cooled whereupon a crystalline precipitate is formed. The precipitate is collected by filtration, washed with acetone and petroleum ether solvent (mixture of lower hydrocarbons having a boiling point range of about 60° to 71° C.; available commercially as Skellysolve B). The product is recrystallized from methyl isobutyl ketone and found to have the following properties:

Melting point: 174° to 176° C.
Specific rotation: $[\alpha]_D^{24°} +333°$ (C=1, water).
Elemental Analysis: C, 44.7%; H, 5.7%; N, 12.95%; indicating the empirical formula $C_8H_{12}N_2O_3S$ and molecular weight of 216.26. ($C_8H_{12}N_2O_3S$ requires C, 44.4%; H, 5.6%; N, 13.0%; O, 22.2%; S, 14.8%).
Infrared absorption spectrum in a KBr pellet with characteristic absorption maxima at the following wave lengths expressed in microns: 2.99, 3.36, 3.4—>4.0, 5.84, 6.06, 8.1.

The structural formula of the product, 3,3-dimethyl-8-oxo-4-thia-1,7-diazobicyclo[3.3.0]octane-2-carboxylic acid, is as follows:

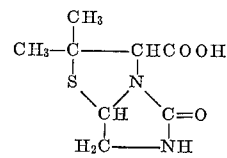

Treatment of this product with methanolic hydrochloric acid results in formation of the methyl ester having the following characteristics:
Melting point: 130–131° C.
Specific rotation: $[\alpha]_D^{25} +249°$ (C=1, $CH_3OH$)
Infrared absorption spectrum in a KBr pellet having characteristic absorption maxima at the following wave lengths expressed in microns: 3.05, 3.35, 5.7, 5.82 and 5.99.

*Example 6.—Alkaline hydrolysis of 8-hydroxypenillic acid to produce hydroxyisopenillic acid*

A reaction mixture containing 6.08 gm. of the disodium salt of 8-hydroxypenillic acid in 8 ml. 5 N sodium hydroxide and 20 ml. water is maintained for 3 days at room temperature and is then adjusted to pH 2.5 with 4 N hydrochloric acid and stirred for 1 hour during which time a crystalline product precipitates. The product is collected by filtration, washed with water and methanol and redissolved in 30 ml. water previously adjusted to pH 5 with aqueous sodium hydroxide. The solution is then adjusted to pH 2.5 with 4 N hydrochloric acid and cooled overnight as a crystalline product is precipitated. The crystalline product, a semi-sodium salt, is collected by filtration, washed with water and acetone, and air-dried. The product is found to have the following characteristics:

Specific rotation: $[\alpha]_D -92°$ (C=1, 0.1 N NaOH)
Melting point: 227–228°C.
Elemental analysis: C, 39.33%; H, 4.83%; N, 10.25%; Na, 4.1%; Ash, 12.7%.
Infrared absorption spectrum with characteristic absorption maxima at the following wave lengths expressed in microns: 2.72, 2.80, 3.02, 3.35, 3.4, 3.85, 4.25, 5.2, 5.72, 5.88. 6.0, 6.12, 6.2.

The structural formula of the product, hydroxyisopenillic acid, is as follows:

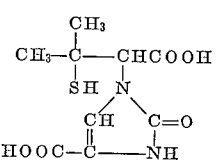

*Example 7.—Preparation of the penicillin of the decarboxylation product of 8-hydroxypenillic acid*

The acid hydrolysis decarboxylation product of 8-hydroxypenillic acid prepared as described in Example 5 above (10.8 gm.; 0.05 mole) is put with 84 ml. of dimethylformamide into a 250 ml. flask equipped with a stirrer, thermometer and dropping funnel. The mixture is stirred, 7.7 ml. of triethylamine (.055 mole) is added, and the solution is cooled to 0 to −5° C. in an ice salt bath. At approximately −5° C., 50 ml. (.05 mole) of ethylchloroformate is added dropwise to the solution and at a rate such that the maximum temperature of the reaction is 0° C. This reaction mixture is stirred for about 10 minutes at 0 to −5° C. A solution of 6-aminopenicillanic acid (10.8 gm.; 0.05 mole) dissolved in 84 ml. of dimethylformamide, 7.7 ml. of triethylamine and 16.7 ml. of water and cooled to 0° C., is added as rapidly as possible to the cold mixed anhydride slurry. Sodium bicarbonate (4.17 gm.; 0.0495 mole) is then added to the reaction mixture which is then stirred and cooled for 15 minutes. Stirring is continued while the reaction mixture is allowed to warm to room temperature over a period of approximately 1½ hours. The mixture is diluted with 250 ml. of water, layered with 100 ml. of methyl isobutyl ketone, cooled to 5 to 10° C. and acidified to pH 2.0 with dilute sulfuric acid. The layers are separated after thorough mixing and a second 100 ml. extraction is made with methyl isobutyl ketone. The methyl isobutyl ketone combined extract is added to 100 ml. of water and while stirring the pH of the solution is adjusted to 7.0 with 10% NaOH solution. The layers are separated and a second 100 ml. water extraction is made of the methyl isobutyl ketone. The combined water extract is layered with 100 ml. of methyl isobutyl ketone and another acid extraction is made as before. The combined acid methyl isobutyl ketone extract is clarified by filtration through Dicalite and then concentrated at reduced pressure to about ⅔ of its volume. This dried methyl isobutyl ketone solution is poured into a stirred solution of 20 ml. of 40% potassium ethylhexanoate in butanol. The potassium salt of the penicillin is immediately precipitated as an amorphous white solid. The resulting suspension is stirred and cooled for about one hour then filtered, washed with cold methyl isobutyl ketone and then petroleum ether (Skellysolve B). After drying overnight in an oven at 50° C., a yield of 8.68 gm. is obtained of white powder representing a stoichiometric weight yield of 38.2%. This product, which has the following structure,

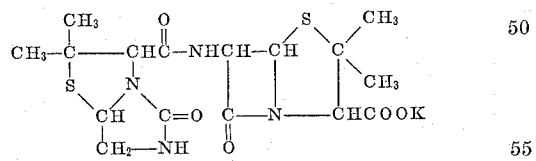

is found to contain the β-lactam ring structure as shown by infrared analysis and to inhibit *Staph. aureus* Smith at a concentration of 0.001 percent by weight.

*Example 8.—Preparation of the penicillin derived from 8-hydroxypenillic acid*

8-hydroxypenillic acid (2.60 gm.; 0.01 mole) prepared as described in Example 1 above is put with 17 ml. of dimethylformamide into a 250 ml. flask equipped with a stirrer, thermometer and dropping funnel. The mixture is stirred, 3.0 ml. of triethylamine (0.022 mole) is added, and the solution is cooled to 0 to −5° C. in an ice salt bath. At approximately −5° C., ethylchloroformate (2.0 ml.; 0.021 mole) is added dropwise to the solution and at a rate such that the maximum temperature of the reaction is 0° C. This reaction mixture is stirred for about 10 minutes at 0 to −5° C. A solution of 6-aminopenicillanic acid (4.32 gm.; 0.02 mole) dissolved in 34 ml. of dimethylformamide, 3.08 ml. of triethylamine and 6.7 ml. of water and cooled to 0° C., is added as rapidly as possible to the cold mixed anhydride slurry. Sodium bicarbonate (1.68 gm.; 0.02 mole) is then added to the reaction mixture which is then stirred and cooled for 15 minutes. Stirring is continued while the reaction mixture (having a pH of 7.1) is allowed to warm to room temperature over a period of approximately 1½ hours. The mixture is diluted with 65 ml. of water, layered with 30 ml. of methyl isobutyl ketone, cooled to 5 to 10° C. and acidified to pH 2.0 with dilute sulfuric acid. The layers are separated after thorough mixing and a second 30 ml. extraction is made with methyl isobutyl ketone. The methyl isobutyl ketone combined extract is added to 100 ml. of water and while stirring the pH of the solution is adjusted to 6.9 with 10% NaOH solution. The layers are separated and a second water extraction is made of the methyl isobutyl ketone. The combined water extract is layered with methyl isobutyl ketone and another acid extraction is made as before. The combined acid methyl isobutyl ketone extract is clarified by filtration through Dicalite and then concentrated at reduced pressure to about ⅔ of its volume. This dried methyl isobutyl ketone solution is poured into a stirred solution of 10 ml. of 40% potassium ethylhexanoate in butanol. The potassium salt of the penicillin is immediately precipitated as an amorphous white solid. The resulting suspension is stirred and cooled. The product is collected by filtration, washed with cold methyl isobutyl ketone and then petroleum ether (Skellysolve B). After drying overnight in an oven at 50° C., a yield of 5.15 gms. is obtained of white powder representing a stoichiometric weight yield of 70.5%. This product, which has the following structure,

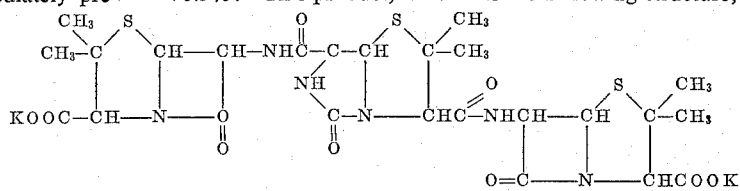

is found to contain the β-lactam ring structure as shown by infrared analysis and to inhibit *Staph. aureus* Smith at a concentration of 0.001 percent by weight.

We claim:
1. A compound having the structural formula

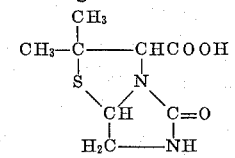

2. A compound having the structural formula

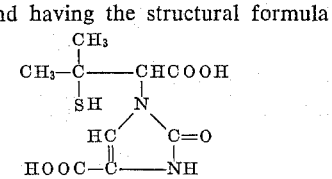

3. A member selected from the group consisting of the acids having the formula

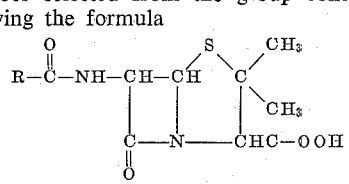

wherein R is selected from the group consisting of the following radicals:

(a)

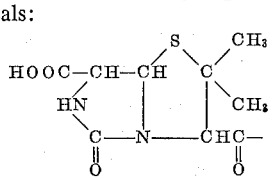

(b)

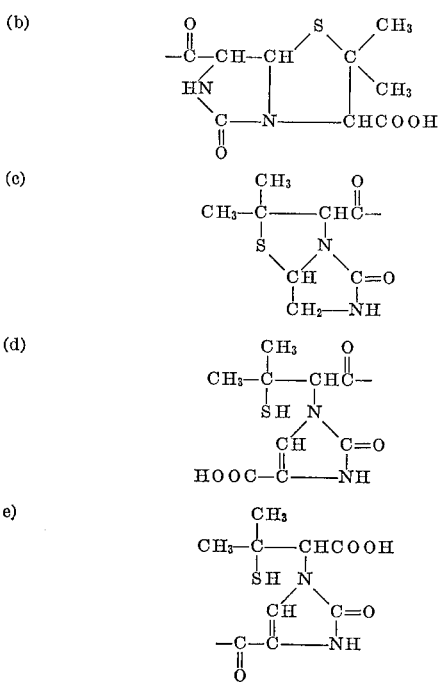

(c)

(d)

e)

and their sodium, potassium, calcium, aluminum and ammonium salts and their nontoxic substituted ammonium salts with an amine selected from the group consisting of tri(lower)alkylamines, procaine, dibenzylamine, N - benzyl - beta - phenethylamine, 1-ephenamine, N,N' - dibenzylethylenediamine, dehydroabietylamine, N,N' - bis - dehydroabietylethylenediamine and N - (lower)alkylpiperidine.

4. In a process for separating a N-acylated-6-aminopenicillanic acid from a mixture of 6 - aminopenicillanic acid and an aqueous N-acylated-6-aminopenicillanic acid, the steps of mixing carbon dioxide with said aqueous mixture at a pH of from about 4 to 8 and at a temperature of about 0° to 50° C. whereby said 6-aminopenicillanic acid is converted to 8-hydroxypenillic acid, removing the 8-hydroxypenillic acid from the reaction mixture by solvent extraction and recovering said N-acylated-6-aminopenicillanic acid.

5. The process for the preparation of 8-hydroxypenillic acid comprising the steps of (1) mixing 6-aminopenicillanic acid and carbon dioxide in an aqueous medium and (2) recovering from said medium the 8-hydroxypenillic acid formed thereby.

6. The process for the preparation of 8-hydroxypenillic acid comprising mixing stoichiometric equivalents of 6-aminopenicillanic acid and carbon dioxide in an aqueous reaction medium at a pH of from about 4 to 8 and at a temperature of from about 0° to 50° C. and recovering from said medium the 8-hydroxypenillic acid formed thereby.

7. The process for the preparation of 8-hydroxypenillic acid comprising mixing stoichiometric equivalents of 6-aminopenicillanic acid and carbon dioxide in an aqueous medium at a pH of from about 5 to 7 and at a temperature of from about 20° to 25° C. and recovering the 8-hydroxypenillic acid formed thereby.

8. The process for the preparation of 8-hydroxypenillic acid comprising the steps of adding carbon dioxide to an aqueous solution containing essentially only 6-aminopenicillanic acid at a pH of from 4 to 8, maintaining said solution at a temperature of at least about 0° C. during the reaction of said 6-aminopenicillanic acid and carbon dioxide, and thereafter recovering the 8-hydroxypenillic acid formed thereby.

9. A member selected from the group consisting of the acids having the formulae

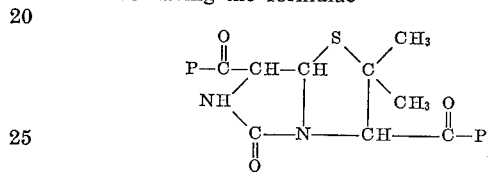

and

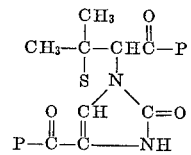

wherein "P" is

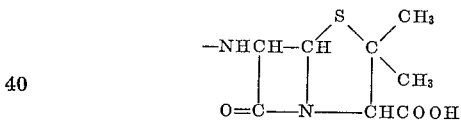

and their sodium, potassium, calcium and ammonium salts and their nontoxic substituted ammonium salts with an amine selected from the group consisting of tri(lower)alkylamines, procaine, dibenzylamine, N - benzyl-beta-phenethylamine, 1-ephenamine, N,N'-bis-dehydroabietylethylenediamine and N-(lower)alkylpiperidine.

OTHER REFERENCES

Johnson et al.: Jour. Amer. Chem. Soc., vol. 83, page 3534 (1961).

Tardrew et al.: Jour. of Biol. Chemistry, vol. 234, pages 1850–1856 (1959).

NICHOLAS S. RIZZO, *Primary Examiner.*